United States Patent

[11] 3,533,327

[72] Inventor Gilbert W. Hagerty
 Barrington, Illinois
[21] Appl. No. 756,185
[22] Filed Aug. 29, 1968
[45] Patented Oct. 13, 1970
[73] Assignee Industrial Specialties, Inc.
 Barrington, Illinois
 a corporation of Illinois

[54] CHIP REMOVAL SYSTEM
 6 Claims, 7 Drawing Figs.
[52] U.S. Cl. .................................................. 90/11,
 15/314, 55/385, 55/432, 55/459, 77/55, 51/273
[51] Int. Cl. ...................................................... B23c 7/00,
 B24b 55/06
[50] Field of Search .......................................... 90/11;
 15/314, 339, 301, 352; 77/55; 55/429, 385, 432,
 433, 428, 459; 51/273; 30/133; 144/252, 252-1;
 143/157.2

[56] References Cited
 UNITED STATES PATENTS
 1,969,513 8/1934 Kelley .......................... 15/339X
 2,975,847 3/1961 Feucht ......................... 55/432X
 3,167,260 1/1965 Gibbons et al. ................ 51/273X
 FOREIGN PATENTS
 458,939 4/1947 Canada ......................... 77/55
 780,761 8/1957 Great Britain ................. 51/273
Primary Examiner—Gil Weidenfeld
Attorney—Hume, Clement, Hume & Lee ABSTRACT: A pneumatic chip removal and collector system for a milling machine. A shroud assembly with frusto-conical internal configuration draws chips upwardly into its confines from around the cutter head and directs them to a collector assembly. The collector assembly collects and holds a tangled mass of spiral chips within an inverted frusto-conical container which facilitates their expeditious and simple removal.

Patented Oct. 13, 1970

INVENTOR.
Gilbert W. Hagerty
BY Hume, Clement, Hume & Lee
Attorneys.

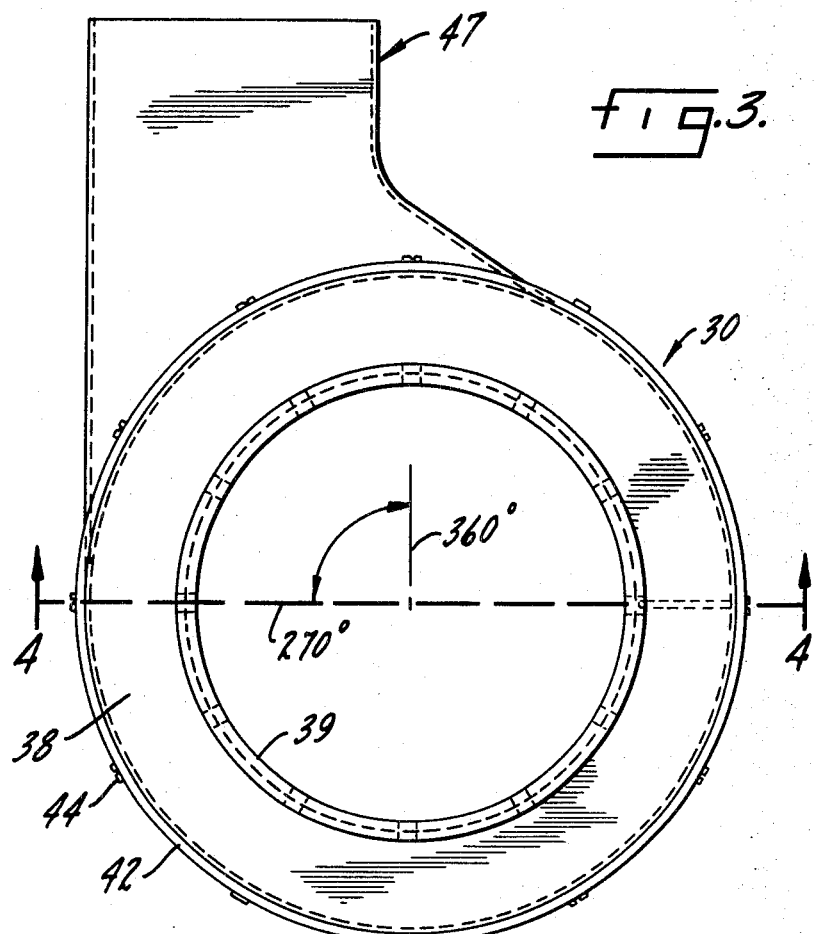
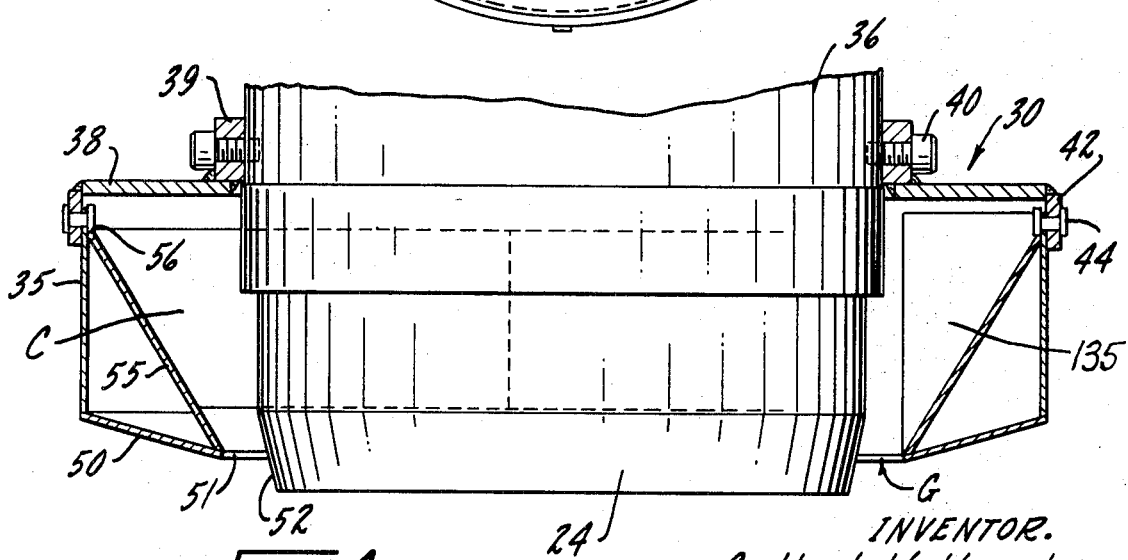

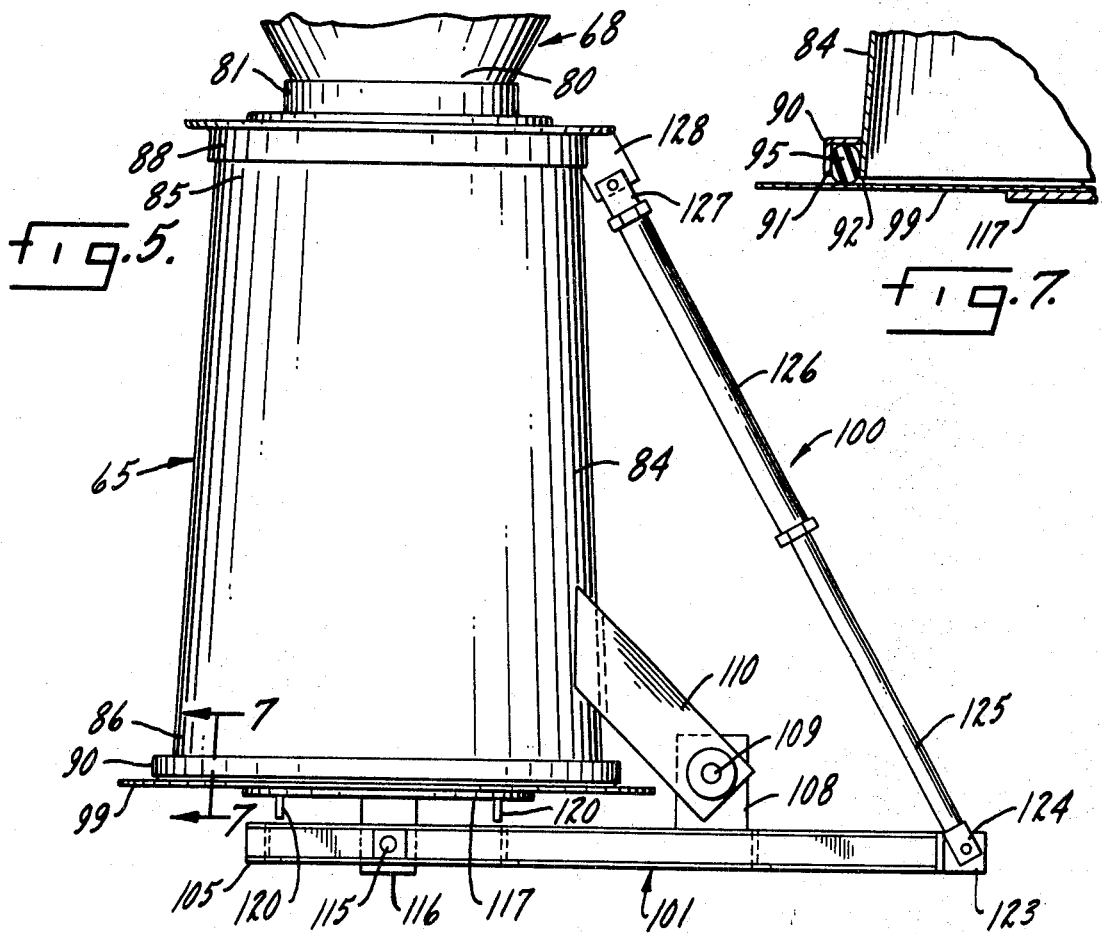
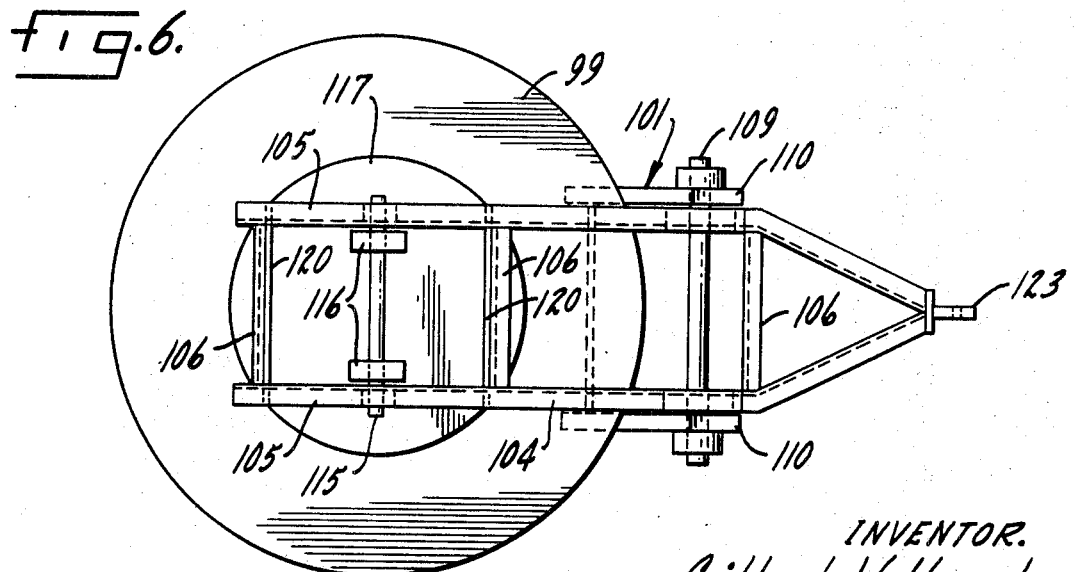

3,533,327

1

CHIP REMOVAL SYSTEM

BACKGROUND OF THE INVENTION

This invention relates in general to machine tools. It deals particularly with a pneumatic system for removing and collecting chips produced by the face milling of a metal workpiece by a milling machine.

Pneumatic chip removal systems for use with milling machines are generally well-known, of course. An exemplary system is illustrated in U.S. Pat. No. 2,944,465, for example. However, known systems have not provided efficient chip removal or transmission to a collecting facility. The air flow volume required has been relatively high, necessitating the use of a larger and more expensive pneumatic pump, for example.

In addition, the chip collector facilities of known systems are inefficient and difficult to empty. Spiral chips from the milling operation tend to become ensnarled in collectors and, accordingly, virtually inseparable. The ensnarled chips wedge downwardly into conventional cyclone containers, for example, and require considerable labor to free and withdraw them.

SUMMARY OF THE INVENTION

The pneumatic chip removal and collector system of the present invention provides, as will hereinafter be described in detail, marked improvements in construction and operation over known systems. These marked improvements are found in the areas of the chip removal shroud assembly and the collector assembly.

It is an object of the present invention to provide a chip removal and collector system which removes the chips from the circumferential area surrounding the milling cutter head with greater efficiency than heretofore achieved by broadly similar systems. Another object is to provide a pneumatic chip removal and collector system wherein the high efficiency of the system is effective to facilitate the use of smaller vacuum producing equipment. Still another object is to provide a pneumatic chip removal and collector system wherein more efficient cooling of the cutting head is achieved by the air flow through the shroud assembly.

A further object is to provide a chip removal and collector system wherein the chips are more efficiently received and held in a collector assembly. A collector container receives the chips and retains them for eventual disposal. A still further object is to provide a collector container wherein the collected chips are collected and retained in compact relationship while their removal for disposal is obtained simply and expeditiously by merely opening the bottom of the container. No wedging, entanglement of the chips impedes their removal.

The foregoing and other objects are realized in accord with the invention by providing a shroud with a closely controlled air gap between it and the rotating milling head. This air gap control together with a frusto-conical guide baffle within the shroud assures highly effective removal and optimum transfer of the milling chips from the area of the milling cutter head to a collector assembly.

The collector assembly receives the pneumatically transported chips and retains them in a container. The natural curl configuation of the chips causes them to intertwine in a difficult-to-untangle mass. An inverted frusto-conical collector container facilitates removal of the snarled chips with ease through a bottom door. The bottom door normally maintains a relatively air-tight seal against the bottom of the container but is pivotable away from the bottom to facilitate chip removal.

BRIEF DESCRIPTION OF THE DRAWINGS

The invention, together with its construction and method of operation, along with other objects and advantages thereof, is illustrated more or less diagrammatically in the drawings, in which.

2

Figure 1:
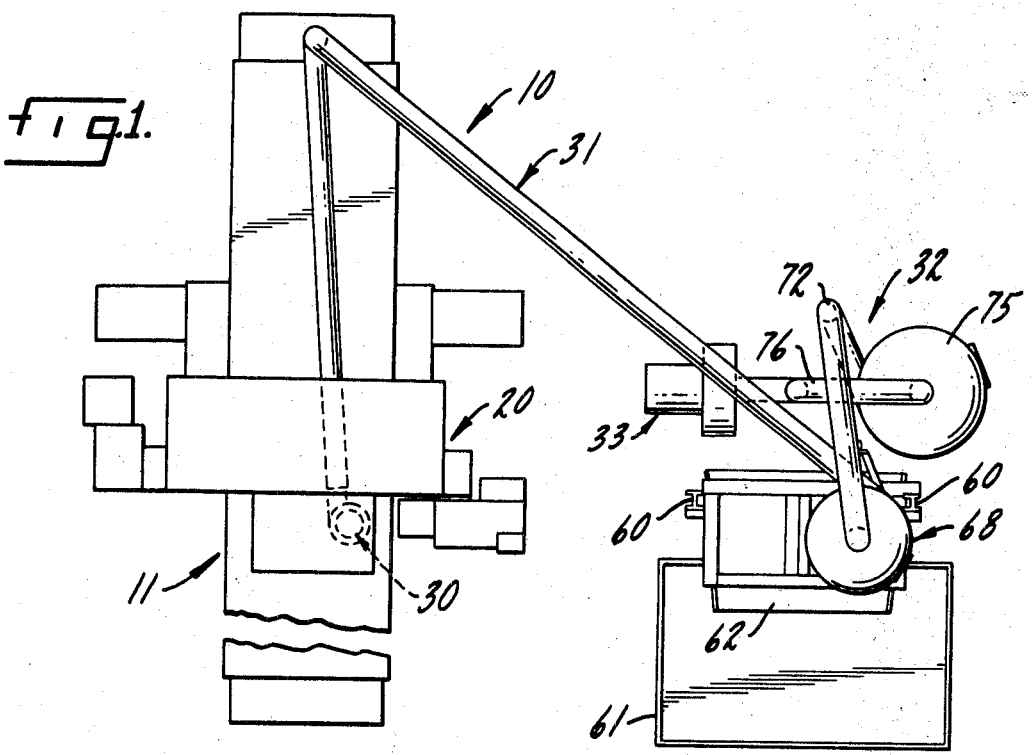
FIG. 1 is a top plan view of a pneumatic system for removing and collecting chips from the milling head of a milling machine mounted in operative relationship on the machine.
Figure 2:
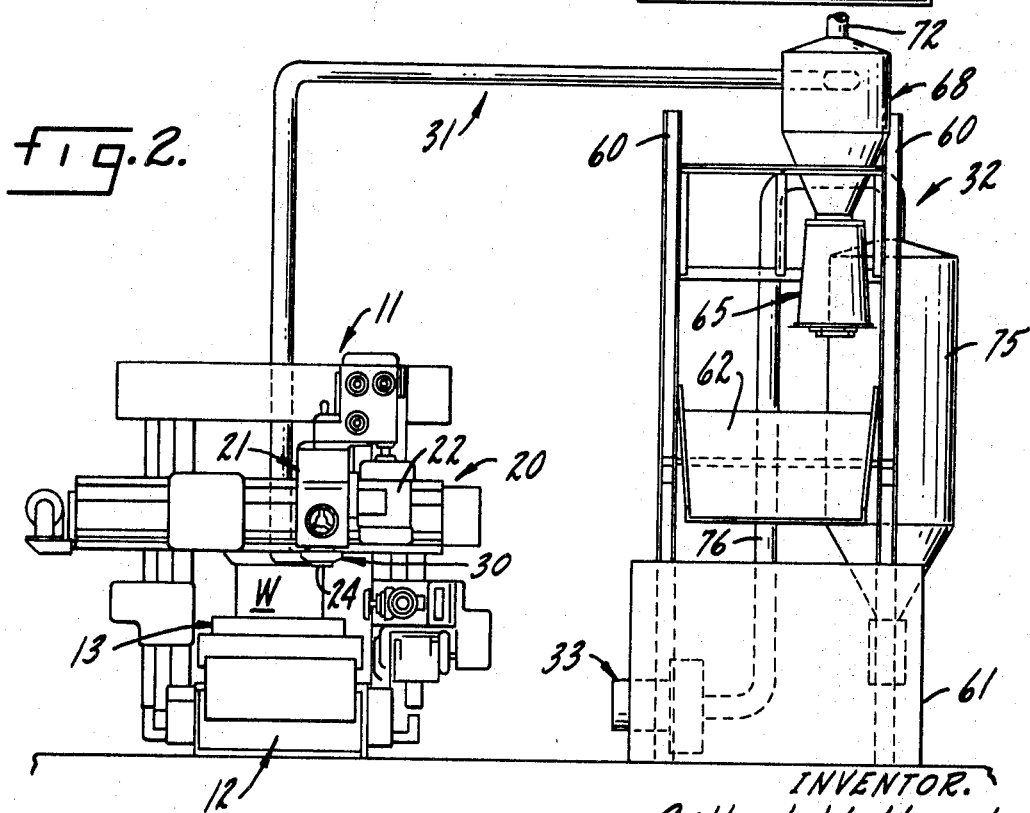

FIG. 2 is a side elevational view of the system and machine illustrated in FIG. 1;

FIG. 3 is an enlarged plan view of a portion of the chip collector and removal system, illustrating the removal shroud assembly and the milling cutter head;

FIG. 4 is a sectional view taken along line 4–4 of FIG. 3;

FIG. 5 is an enlarged front elevational view of the collector assembly in the removal and collector system of the present invention;

FIG. 6 is a bottom plan view of the collector container illustrated in FIG. 5; and FIG. 7 is a further enlarged sectional view taken along line 7–7 of FIG. 5.

DESCRIPTION OF THE PREFERRED EMBODIMENTS

Referring now to the drawings, and particularly to FIGS. 1 and 2, a chip removal and collector system embodying features of the present invention is illustrated generally at 10. The system 10 is operationally connected, according to the invention, to a large, planer-type milling machine 11 of broadly conventional construction.

The milling machine 11 comprises a bed 12 which slideably supports a table 13 adapted to move longitudinally of the bed. Mounted on the table 13 for movement therewith is a suitable fixture for holding a work-piece W which is adapted to be processed by the machine 11. The work-piece W is in the form of a flat slab or sheet of machinable metal such as an aluminum alloy or the like.

Mounted on the bed 12, extending upwardly from it, and disposed over the work-piece W, is a conventional superstructure 20 which carries a headstock 21. The headstock 21 is equipped with a driving motor 22 which drives a high speed cutter head 24. The superstructure 20 contains means for providing various services such as electric power, hydraulic pressure, cooling water, and the like to the headstock 21 in a conventional manner. It also provides a suitable control arrangement for directing traverse of the work-piece W by the cutting head 24. As the head 24 traverses and machines the work-piece W, it removes metal in the form of curled "chips" which break apart and are thrown outwardly of the head 24 in a well known manner. The headstock 21 is arranged for horizontal surface machining on the work-piece W. In practice, it might be joined by another, similar headstock (not shown) arranged to mill the side of the work-piece W.

The pneumatic chip removal and collector system 10 embodying features of the present invention includes a chip removal shroud assembly 30 which is mounted on the cutter head 24 in the manner illustrated in FIGS. 1—4. The shroud assembly 30 is connected in a conventional manner by a pipe and tube assembly 31 to the chip collector assembly embodying features of the present invention, illustrated generally at 32. In operation, in a manner hereinafter described in detail, a vacuum pump unit 33 associated with the collector assembly 32 creates an air flow into the shroud assembly 30 around the milling cutter head 24 and removes chips to the collector assembly 32.

Turning now to the details of construction of the chip removal shroud assembly 30, best illustrated in FIGS. 3 and 4, it comprises a generally cylindrical side wall 35 fixedly secured to the "pen" 36 which mounts the milling head 24 in rotatable relationship. The side wall 35 extends around the periphery of the cutter head 24 to substantially enclose the head above the work-piece W. A top wall 38 is welded to a ring 39 bolted by conventional machine bolts 40 to the annular periphery of the plate 38 in depending relationship therewith, and the cylindrical wall 35 is bolted to the ring 42, also by conventional machine bolts 44.

The top wall 38 and side wall 35 terminate in, and form, an exit chute 47 disposed in the fourth quadrant (270° to 360° as seen in FIG. 3) of rotation of the cutter head 24 in the annular shroud assembly 30, the head 24 rotating in a clockwise direction. Chips are drawn into the shroud assembly 30 and through the chute 47 into the pipe and tube assembly 31, for transfer in the air stream to the collector assembly 32.

Welded to the lower edge of the shroud assembly side wall 35, and sloping downwardly and inwardly therefrom toward the annular cutter head 24, is the bottom wall 50 of the shroud assembly 30. The bottom wall 50 terminates at an annular inner edge 51 which is spaced, according to the invention, from one-fourth to 1 inch from the tapered annular lower periphery 52 of the cutting head 24, depending upon head size, workpiece W material, etc. The bottom wall 50 of the shroud assembly 30 extends entirely around the cutting head 24 for 360°, thus extending across the entrance to the exit chute 47.

Inclined upwardly from the inner edge 51 of the bottom wall 50 is an internal chip baffle 55. The chip baffle 55 is welded, adjacent its lower edge, to the bottom plate 50 at the inner annular edge 51 thereof, and terminates at its upper edge 56 against the side wall 35 of the shroud assembly 30, immediately below the mounting bolts 44. The upper edge 56 of the baffle 55 is preferably welded to the inner surface of the side wall 35. The baffle 55 forms, in effect, a frusto-conical outer wall for the chamber C in the shroud assembly 30.

The baffle 55 is generally coextensive with the curved portion of the side wall 35. In other words, a gap is provided in it at the opening to the exit chute 47 to facilitate departure of the chips from the shroud assembly 30 through the exit chute 47, and the pipe and tube assembly 31, to the collector assembly 32.

Turning now to the details of the collector assembly 32, it includes two I-beam posts 60 upright on the facility floor adjacent the milling machine 12. A rectangular chip collector box 61 of conventional sheet metal construction is seated on the floor adjacent the posts 60. Immediately above the box 61, and pivotally mounted between the posts 60, is a chip director chute 62, adapted to be controlled manually by the operator to direct chips from a collector container 65 embodying features of the invention into the box 61 when the container 65 is emptied, according to the invention.

The collector container 65 is mounted on and depends from a broadly conventional "cyclone" container 68. The cyclone container 68 is, in turn, mounted between the posts 60 adjacent their upper ends. Into the side of the cyclone container 68 extends one end of the pipe and tube assembly 31, while out of the top of the container 68 extends a vacuum pipe 72.

The vacuum pipe 72 is connected, in turn, with a large vacuum stabilization tank 75 mounted on a suitable pedestal adjacent the posts 60. The tank 75 communicates with the vacuum pump unit 33 through another vacuum pipe 76. Operation of the pump unit 33 in a conventional manner is effective to induce a carefully controlled pressure reduction or vacuum in the container 75, and it is this vacuum effective through the cyclone container 68 to the shroud assembly 30 which creates the air flow that entrains the chips formed by operation of the milling cutter head 24 and carries them to collection in the collector container 65 in a manner hereinafter discussed in detail.

The collector container 65 is joined to the open, lower end 80 of the cyclone container 65 by an annular, flanged fitting 81. The fitting 81 encircles the relatively small diameter lower end 80 of the cyclone container 65 and is preferably welded thereto.

The collector container 65 includes an inverted, frusto-conical side wall 84 having a relatively smaller diameter upper end 85 and a relatively larger diameter lower end 86. A flanged cover 88 is welded over the open upper end 85 of the container wall 84 and this cover is, in turn, secured to the flanged fitting 81 by welding or the like. A suitable opening is formed in the roof 88 of the container 65, coextensive with the opening in the lower end 80 of the cyclone container 68, through the fitting 81.

Referring particularly to FIG. 7, the lower end 86 of the side wall 84 in the collector container 65 has an annular angle member 90 welded to its outer surface and extending around its periphery. The lower edge 91 of the angle member 90 and the lower edge 92 of the side wall 84 lie in substantially the same plane. An O-ring 95 of sufficient diameter to extend slightly below this plane is seated in the channel formed by the angle member 90 and the lower end 86 of the side wall 84.

Adapted to seat tightly against the O-ring 95 and, accordingly, form an air tight seal with the side wall 84 of the container 65 is a bottom wall 99 fabricated of slightly flexible sheet metal. The bottom wall 99 is somewhat larger in diameter than the O-ring 95 and is normally held against the O-ring by a fluid motor 100 operated actuator arm assembly 101.

The arm assembly 101 comprises a generally rectangular frame 104 comprised of side rails 105 joined by cross members 106. Intermediate the ends of the frame 101 are provided a pair of upstanding ears 108 which are journaled on a shaft 109 extending between mounting arms 110 welded to and depending outwardly from, the side wall 84 of the collector container 65.

The inner end of the frame 101 is pivotally connected via a journal shaft 115, to depending ears 116 secured to a central stiffening disc 117 welded to the bottom wall 99 of the container 65. The shaft 115 is journaled in the ears 116 and, accordingly, the bottom wall 99 is adapted to pivot about the axis of the shaft 116 relative to the frame 104, within the relatively limited angular reaches afforded by stop members 120 provided on the bottom of the disc 117 and adapted to engage the frame 104 after the bottom wall 99 has pivoted a slight distance.

The outer end of the frame 104 is formed by converging side rails 105 and an attachment eye is welded thereto. Pivotally connected to the attachment eye 123 at 124 is the piston rod 125 of the conventional fluid motor 100. The cylinder 126 of the motor 100 is pivotally connected, at its free end 127, to a suitable fitting 128 welded to the flanged roof 88 of the container 65.

In normal operation of the chip removal and collector system 10 embodying features of the invention, the fluid motor 100 is in its extended relationship as illustrated in FIG. 5. Accordingly, the actuator arm assembly 101 is pivoted about its journal shaft 109 to urge the slightly flexible bottom wall 99 of the collector container 65 tightly against the O-ring 95. Because the bottom wall 99 is actually pivotally connected to the frame 101, it seats uniformly against the O-ring. The slight flexibility of the bottom wall 99 permits it to bend where necessary to assure a uniform seat and air tight seal. In fact, where the flexibility of the wall 99 is precisely controlled, it is possible to eliminate the O-ring 95 and still obtain an excellent seal.

During operation of the system 10, it is important that a substantially airtight seal be maintained between the slightly flexible bottom wall 99 and the side wall 84 of the collector container 65. The seal is necessary so that the partial vacuum induced in the tank 75, the cyclone container 68, the collector container 65 and through the pipe and tube assembly 31 to the shroud assembly 30, is not broken by leakage into the collector container 65.

The partial vacuum is effective inside the shroud assembly 30 encircling the milling cutter head 24. A pressure reduction of approximately 1 p.s.i. below atmospheric pressure is effective to draw air into the shroud assembly 30 through the gap G encircling the cutter head 24 at approximately 1,200 cubic feet per minute. Chips removed from the workpiece W by the rotating cutter head 24 and thrown outwardly of the head are drawn up through the gap G.

The inertia imparted by the rotating head 24 causes the bulk of the chips to rotate in the shroud assembly 30 on the baffle 55. At the same time, the flow of air draws them up the baffle 55. The frusto-conical shape of the baffle 55 aids the movement of the chips upwardly until they are drawn through the gap in the baffle into the exit chute 47, after a maximum of 270° rotation in the shroud assembly 30. A vertical separator plate 135 serves to cause chips counterclockwise of the plate to be drawn in that direction to the chute 47. The chips are then drawn through the pipe and tube assembly 31 into the cyclone container 68.

In the cyclone container 68, the whirling chips tend to fall under the influence of gravity toward the conical base of the container. The air flow from the container 68 is, of course, out through the pipe 72. The whirling chips, before becoming entangled with each other, pass out the container 68 and into the inverted frusto-conical collector container 65. In the collector container 65, the chips come to rest and pile up on the floor 99. They become entangled in a manner well known with spiral machine chips of this type.

To remove the entangled mass of chips from the collector container 65, according to the invention, the fluid motor 100 is actuated to pivot the bottom floor 99 of the container away from the lower edge 92 of its side wall 84. With a negative wall angle, the mass of chips simply falls from the collector container 65 into the chute 62 and thence into the box 61. The bottom floor 99 is then disclosed by manipulation of the fluid motor 100 for further operation.

A pneumatic chip removal and collector system 10 has now been described which makes optimum use of relatively low volume air flow. The one-quarter to 1 inch gap G between shroud and outlet has been found to be extremely efficient, and the frusto-conical baffle 55 greatly assists chip travel upward and outward of the assembly 30.

The collector container 68 receives and retains chips in large volume. Nevertheless, they can be simply and expeditiously removed for disposal.

While the embodiment described herein is at present considered to be preferred, it is understood that various modifications and improvements may be made therein, and it is intended to cover in the appended claims all such modifications and improvements as fall within the true spirit and scope of the invention.

I claim:

1. A pneumatic system for removing and collecting chips from adjacent the cutter head of a milling machine, comprising:
   a. a shroud assembly enclosing said cutting head above its cutting face;
   b. said cutting head extending through an annular opening in said shroud assembly with a gap of predetermined width separating the annular inner edge of said opening from the annular periphery of said head;
   c. a collector assembly joined to said shroud assembly;
   d. said collector assembly including means for inducing an airflow into said shroud assembly to suck chips thereinto and carry them to a chip collector container;
   e. said chip collector container having an inverted, frusto-conical side wall configuration wherein the diameter of said container at the lower end edge of said side wall is greater than its diameter at the upper end of the container; and
   f. said collector container having a removable bottom wall which normally forms a substantially airtight seal with the lower end edge of said side wall.

2. The pneumatic system of claim 1 further characterized in that said bottom wall is fabricated of flexible means adapted to conform to the configuration of the lower end edge of said side wall.

3. The pneumatic system of claim 2 further characterized by and including seal means mounted on and extending around said lower end edge of said side wall for seating against said bottom wall.

4. A pneumatic system for removing and collecting chips from adjacent the cutter head of a milling machine, comprising:
   a. a shroud assembly enclosing said cutting head above its cutting face;
   b. said cutting head extending through an annular opening in the shroud assembly with a gap of predetermined width separating the inner edge of said opening from the annular periphery of said head;
   c. said shroud assembly containing a chip flow chamber extending around said head and communicating with said gap;
   d. the annular outer wall of said chip flow chamber being substantially defined by frusto-conical baffle plate means whereby said outer wall is inclined upwardly and outwardly from the annular periphery of said head;
   e. a collector assembly joined to said shroud assembly;
   f. said collector assembly including means for inducing an airflow into said shroud assembly to suck chips thereinto through said gap and carry them to a chip collector container;
   g. said collector container having an inverted, frusto-conical side wall configuration wherein the diameter of said container at the lower end edge of said side wall is greater than its diameter at the upper end of said container; and
   h. said collector container having a removable bottom wall which normally forms a substantially airtight seal with the lower end edge of said side wall.

5. The pneumatic system of claim 4 further characterized in that:
   a. said baffle plate means extends around approximately 270° of the annular milling head;
   b. said shroud assembly having exit chute means for said chips in communication with said chamber in the remaining approximately 90° segment of said shroud; and
   c. passage means connecting said exit chute means with said collector container.

6. The pneumatic system of claim 5 further characterized in that:
   a. said exit chute means is disposed in the fourth quadrant of the shroud assembly with the quadrants numbered clockwise and the milling head adapted to rotate in that direction; and
   b. a separator plate in said shroud assembly separating said chamber means between said first and second quadrants.